US012664026B2

(12) United States Patent
Khanna et al.

(10) Patent No.: US 12,664,026 B2
(45) Date of Patent: Jun. 23, 2026

(54) HYPERTUNING A MACHINE LEARNING MODEL MICROSERVICES CONFIGURATION TO OPTIMIZE LATENCY

(71) Applicant: Maplebear Inc., San Francisco, CA (US)

(72) Inventors: Sahil Khanna, San Jose, CA (US); Reza Sadri, Irvine, CA (US); Jacob Jensen, Metuchen, NJ (US)

(73) Assignee: Maplebear Inc., San Francisco, CA (US)

( * ) Notice: Subject to any disclaimer, the term of this patent is extended or adjusted under 35 U.S.C. 154(b) by 637 days.

(21) Appl. No.: 18/072,700

(22) Filed: Nov. 30, 2022

(65) Prior Publication Data

US 2024/0176674 A1     May 30, 2024

(51) Int. Cl.
*G06F 9/50* (2006.01)
*G06F 11/34* (2006.01)

(52) U.S. Cl.
CPC ........ *G06F 9/5077* (2013.01); *G06F 11/3442* (2013.01)

(58) Field of Classification Search
CPC ........................... G06F 9/5077; G06F 11/3442
See application file for complete search history.

(56) References Cited

U.S. PATENT DOCUMENTS

| | | | | |
|---|---|---|---|---|
| 12,165,082 B1 * | 12/2024 | Zappella | ............... | G06N 20/00 |
| 2014/0154995 A1 * | 6/2014 | Kennedy | ............... | H04B 17/14 |
| | | | | 455/67.11 |
| 2018/0331905 A1 | 11/2018 | Toledo et al. | | |
| 2020/0120000 A1 * | 4/2020 | Parthasarathy | ......... | H04L 67/10 |
| 2020/0125545 A1 * | 4/2020 | Idicula | ................... | G06N 20/20 |
| 2020/0310396 A1 * | 10/2020 | Gross | ................. | G05B 23/0254 |
| 2021/0304063 A1 | 9/2021 | Bulut et al. | | |
| 2022/0124543 A1 | 4/2022 | Orhan et al. | | |
| 2022/0164327 A1 * | 5/2022 | Zhu | ........................ | G06F 16/217 |
| 2022/0198562 A1 * | 6/2022 | Cella | ...................... | G06Q 40/04 |
| 2022/0269401 A1 * | 8/2022 | Lekivetz | ............. | G06F 3/04847 |
| 2022/0308989 A1 * | 9/2022 | Gardner | .............. | G06F 11/3684 |
| 2023/0410170 A1 * | 12/2023 | Chekuri | ............. | G06Q 30/0201 |
| 2025/0013899 A1 * | 1/2025 | Zappella | ................. | G06N 20/10 |

OTHER PUBLICATIONS

PCT International Search Report and Written Opinion, PCT Application No. PCT/US2023/033834, Jan. 22, 2024, 13 pages.

* cited by examiner

*Primary Examiner* — Dong U Kim

(74) *Attorney, Agent, or Firm* — Fenwick & West LLP

(57) ABSTRACT

An online system facilitates various functions using machine learning model microservices. A tuning mechanism tunes various configuration parameters for each microservice that control allocation of computing resources and other configurations of physical and/or virtual machines that implement the microservices. Tuning may be performed in part by executing tests under various configurations and evaluating an objective function associated with the different configurations. Furthermore, parameters of the objective function may be set based on a trained learning model that learns baseline parameters and weights of the objective function based on historical data.

20 Claims, 4 Drawing Sheets

HYPERTUNING A MACHINE LEARNING MODEL MICROSERVICES CONFIGURATION TO OPTIMIZE LATENCY

BACKGROUND

Machine learning applications solve many problems for an online concierge service or other e-commerce websites and applications. Such platforms may utilize machine learning in areas such as facilitating searches, generating recommendations, fulfilling orders, detecting fraud, and personalizing promotions or other content to users. When deploying such machine learning applications, latency becomes an important aspect that directly affects user experience. It is desirable to tune deployment of such machine learning applications to provide useful, accurate, and cost-efficient results while effectively managing latency.

SUMMARY

In accordance with one or more aspects of the disclosure, a tuning module tunes configuration of machine learning microservices to optimize for latency or other performance metrics. A tuning module obtains an objective function associated with tuning a configuration of a microservice that performs machine learning functions associated with an online system. As used herein, machine learning functions may also include preprocessing and/or postprocessing functions used in combination with the machine learning models. The tuning module defines a configuration search space comprising a range of possible configurations of the microservice. For each of a set of test configurations in the configuration search space, the tuning module configures respective allocations of resources associated with executing the microservice. The tuning module executes the microservice on respective sample requests under the respective allocations of resources while measuring respective operating parameters associated with the objective function, and evaluates the objective function using the respective operating parameters to generate respective objective values for each of the set of test configurations. The tuning module selects a desired configuration from the set of test configurations based on the respective objective values. The tuning module then configures the microservice in accordance with the desired configuration.

In one or more embodiments, the objective function seeks to minimize a combination of latency and cost associated with resource utilization. The resource utilization may include at least processor utilization and memory utilization.

In one or more embodiments, the microservice is deployed in a containerized computing environment in which a set of single-threaded or multi-threaded processes execute in containers utilizing dynamically allocated processing and memory resources.

In one or more embodiments, the configuration space includes a two-dimensional array of variables and values for the variables, wherein the variables include one or more of, without limitation: allocated processors, allocated memory, number of containers, number of processes, number of threads, and machine learning model compression. The variables may also include hardware used (such as the SSD, GPU, task-specific ASICs, and the like), as well as how the machine learning model network, hardware, and microservice configuration are tuned.

In one or more embodiments, the objective function comprises respective baseline values and respective weights associated with each of the operating parameters. Evaluating the objective function may be based on the respective operating parameters, the respective baseline values, and the respective weights. Here, the respective weights and the respective baseline values may be obtained from a trained model that optimizes the respective weights and the respective baseline values based on historical data.

In one or more embodiments, selecting the desired configuration from the set of test configurations may comprise obtaining guardrail constraints associated with one or more of the operating parameters that are derived from a graph of dependent microservices, and selecting the desired configuration in which the one or more operating parameters are within the guardrail constraints.

In further aspects of the disclosure, a non-transitory computer-readable storage medium storing instructions executable by one or more processors for performing the processes described above. In yet another aspect, a computer system includes one or more processors and a non-transitory computer-readable storage medium storing instructions executable by the one or more processors for performing the processes described above.

DETAILED DESCRIPTION

An online system facilitates various functions using machine learning model microservices. A tuning mechanism tunes various configuration parameters for each microservice that control allocation of computing resources and other configurations of physical and/or virtual machines that implement the microservices. Tuning may be performed in part by executing tests under various configurations and evaluating an objective function associated with the different configurations. Furthermore, parameters of the objective function may be set based on a trained learning model that learns baseline parameters and weights of the objective function based on historical data.

The tuning techniques are described herein primarily in the context of an online concierge system 140. However, the online concierge system 140 represents just one example of an online system in which machine learning microservices may be utilized to perform various system functions and tuned according to the embodiments of this disclosure. In other embodiments, the described techniques may be applied in other types of e-commerce platforms that do not necessarily include the same functions as the online concierge system 140 described herein. For example, the described techniques may be deployed to tune microservices that perform machine learning functions associated with traditional online retailers, marketplaces, auctions, or other online platforms. In further embodiments, the described techniques may be employed in other online platforms that are not necessarily in the e-commerce space. For example, the described techniques may be employed by social media platforms, streaming platforms, information platforms, or other online platforms that facilitate various services benefiting from use of machine learning technology.

Figure 1:
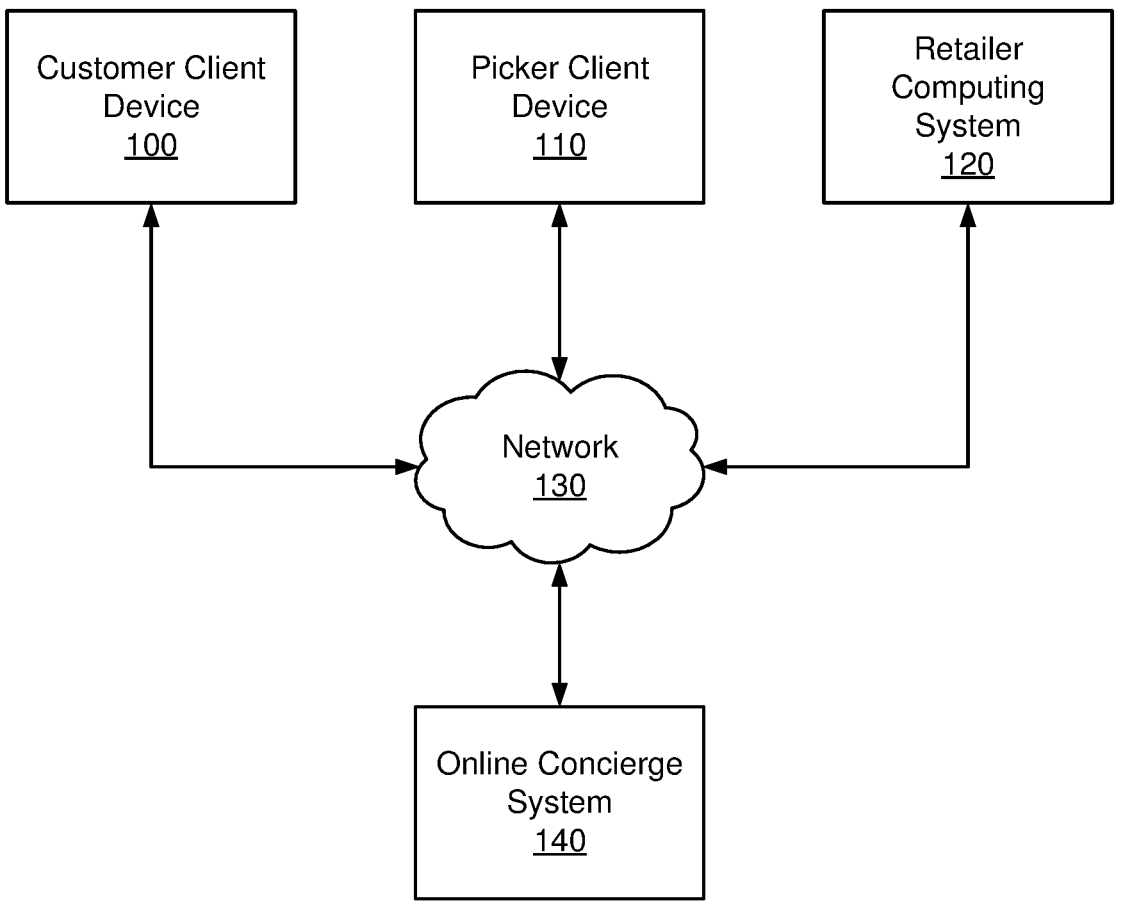
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
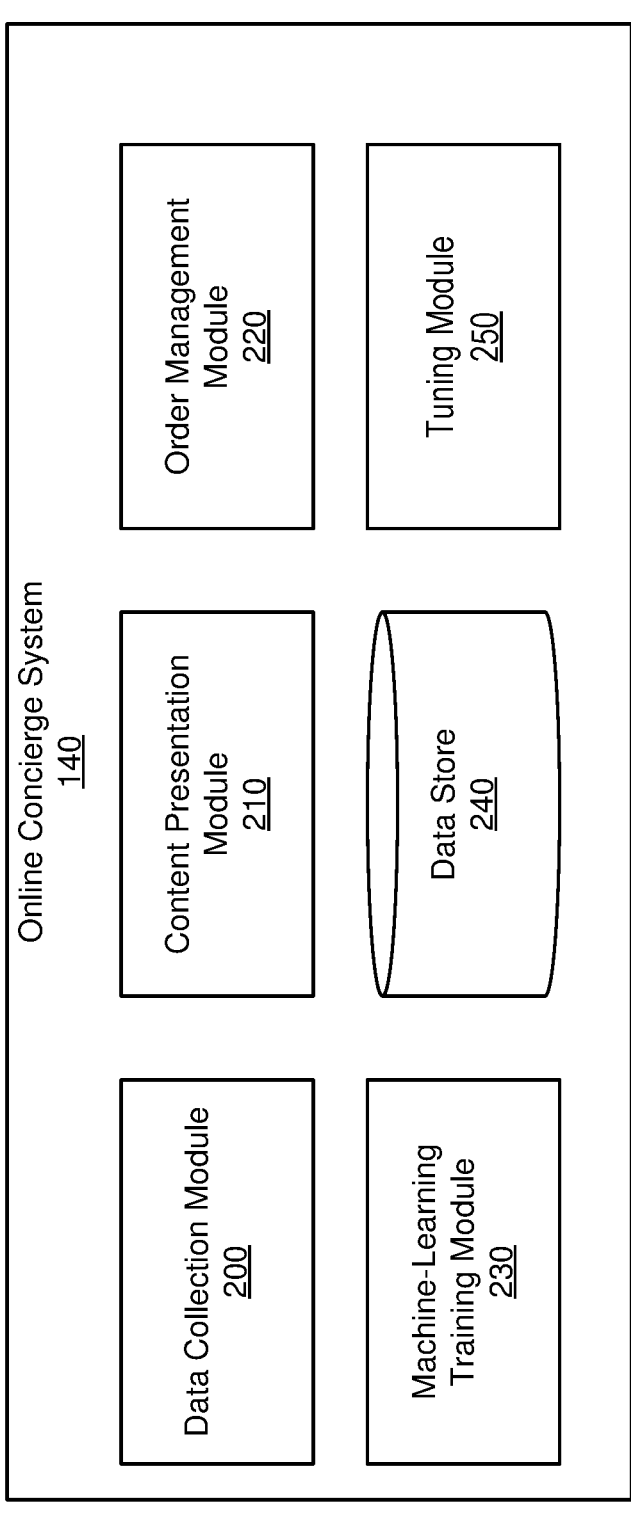
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Various modules of the online concierge system 140 may be implemented in part using one or more machine learning microservices. In this architecture, each microservice may facilitate an independent machine learning algorithm for training and/or inferences. For example, microservices may be utilized for features such as ranking search results for items in the online concierge system 140, predicting item availability, predicting delivery times associated with a placed order, determining promotions to serve to a user, assigning pickers to orders, or other tasks. An example embodiment of an architecture for facilitating various machine learning functions of the online concierge system 140 using microservices is described in further detail below with respect to FIG. 3.

The tuning module 250 tunes configurations of various microservices that implement machine learning functions (training and/or inference) of the online concierge system 140. The configurations may specify the allocation of various hardware resources (e.g., central processing units (CPUs), graphical processing units (GPUs), memory, disk storage, etc.) to the microservice, the allocation of virtualized resources (e.g., containers, processes, threads, etc.), the type of machine learning model and/or compression parameters for a neural network associated with the machine learning model, or other configurable parameters. The tuning module 250 may configure various tests associated with a microservice using a range of different test configurations to learn configurations that optimize an objective (e.g., minimizing cost/resources, latency, or combination thereof). The tuning module 250 may then configure various microservices based on the determined optimal configurations. An example embodiment of a process for tuning configurations of microservices is described in further detail below with respect to FIG. 4.

Figure 3:
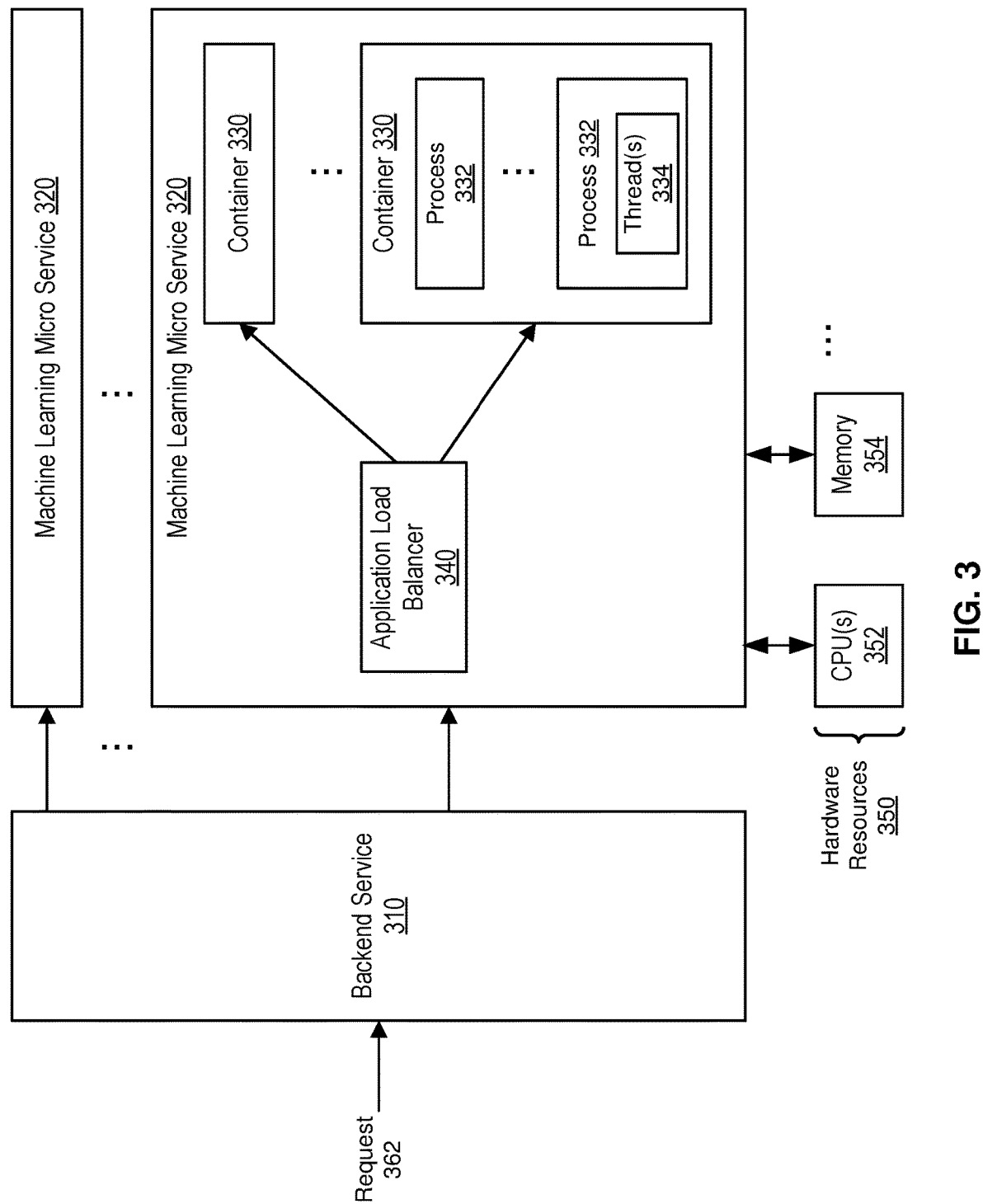
FIG. 3 illustrates an example architecture for facilitating various tasks of the online concierge system using microservices in a containerized computing environment.

FIG. 3 illustrates an example service architecture associated with machine learning-based microservices that may be deployed to facilitate various machine learning functions of the online concierge system 140 described above (or another online system). This architecture may be consistent with various cloud computing and/or storage services (including on-premise and/or off-premise services) or other virtualized and/or distributed computing systems. In this architecture, a backend service 310 receives requests 362 which may initiate processing by one or more machine learning microservices 320. Each machine learning microservice 320 may facilitate a machine learning training and/or inference algorithm associated with different types of requests 362. For example, a request 362 may comprise a search query for items in the online concierge system 140, which may be processed utilizing microservices 320 associated with predicting item availability, personalizing search result rankings to the user, or other tasks. In another example, a request 362 may comprise a request to predict a delivery time associated with a placed order, which may be processed utilizing one or more microservice 320 associated with inferring delivery times. In other examples, requests 362 may initiate microservices associated with inference or training tasks relating to order fulfillment, generating promotions, or other tasks.

Each machine learning microservice 320 may be implemented using one or more containers 330. Containers 330 implement one or more processes 332, which may comprise a single or multiple threads 334. Here, a container 330 represents an isolated virtualized space for executing the processes 332. Processes 332 associated with a container 330 may have visibility into resources associated with the corresponding container 330 while being isolated from resources of processes 332 outside the container 330. Containers 330 may beneficially provide isolation between processes 332 associated with different functions of a microservice 320 or different microservices 320.

The hardware resources 350 represent the physical hardware that is potentially available to implement the microservices 320. The hardware resources 350 may comprise, for example, central processing units (CPUs) 352, memory 354, or other resources such as graphical processing units (GPUs), disk resources, or other computing and/or storage resources. The hardware resources 350 may be distributed (and coupled via a network) such that they are not necessarily geographically co-located. The application load balancer 340 may dynamically allocate hardware resources 350 to containers 330 in an on-demand manner. For example, in response to a request 362 involving a specific microservice 320, the application load balancer 340 may dynamically allocate CPU 352, memory 354, or other resources 350 to the microservice 320 and dynamically instantiate containers 330 for carrying out the relevant processes 332. Containers 330 may be removed once relevant processes 332 are completed and resources 350 may be freed for utilization by other containers 330 and processes 332. Utilization of resources 350 in such an environment can be directly related to cost to an organization utilizing such resources 350, and thus resource optimization may be equivalent to cost optimization.

Figure 4:
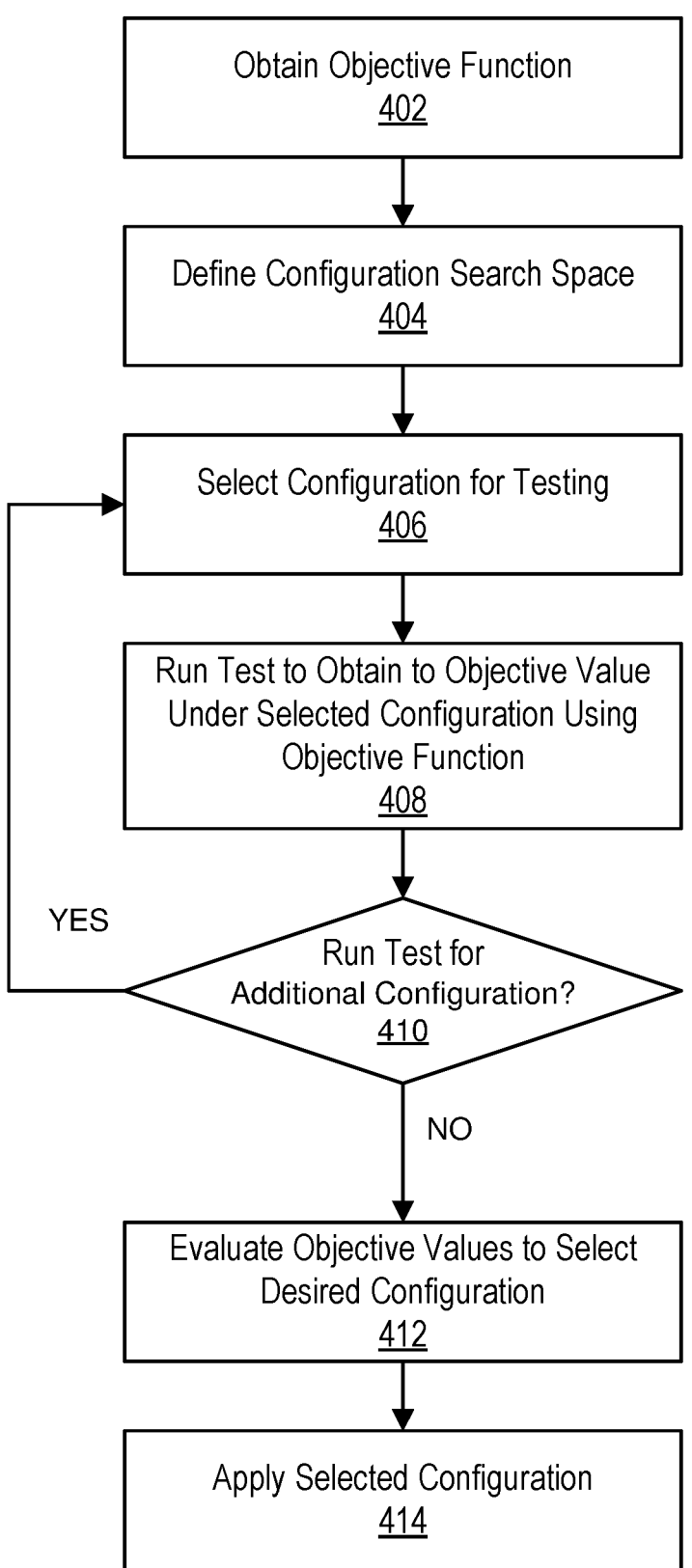
FIG. 4 is a flowchart illustrating an example embodiment of a process for tuning configurations of microservices in an online system.

FIG. 4 is a flowchart illustrating an example embodiment of a process for tuning a configuration of a machine learning microservice. Alternative embodiments may include more, fewer, or different steps from those illustrated in FIG. 4, and the steps may be performed in a different order from that illustrated in FIG. 4.

The tuning module 250 obtains 402 an objective function that defines optimization criteria for achieving a desired goal. In one or more embodiments, the objective function operates to minimize latency and cost (which may be directly attributable to utilization of resources 350) associated with operation of the microservice. The relationship between cost and latency is generally inversely proportional. For example, utilizing more resources generally reduces latency but increases cost. To strike a balance between latency and cost, an objective function may be defined as follows:

$$O_i = \sqrt{w_0(x_i^c - b^c)^2 + w_1(x_i^m - b^m)^2 + w_3\left(x_i^l - b^l\right)^2}$$

where $O_i$ is the objective value for a configuration i, w are weights, $$x_i^c$$

is the measured CPU utilization under the configuration i, $b^c$ is a baseline CPU utilization, $$x_i^m$$

is the measured memory utilization under the configuration i, $b^m$ is a baseline memory utilization, $$x_i^l$$

is the measured latency under the configuration i, and $b^l$ is a baseline latency.

In the above objective functions, the baseline parameters b represent estimated optimal values for the respective measured parameters x and the weights w represent the relative influences in the overall objective function O of the errors between the measured parameters x and baseline parameters b. In one or more embodiments, the tuning module 250 may determine the baseline parameters b and weights w based on a trained model that utilizes historical data derived from historically executed microservices. In one or more embodiments, multiple trained models may be employed to determine baseline parameters b and/or weights w for applying to different types of microservices. Here, the baseline parameters b and/or weights w may be different for microservices using different types of machine learning models and/or performing unrelated services, while the baseline parameters b and/or weights w may be the same for microservices associated with similar machine learning models and/or functions. The trained model may optimize the baseline parameters b and weights w based on various external objectives associated with overall operation of the online concierge system 140 such as profitability, on-time delivery rate, customer satisfaction, or other business and/or application metrics. Baseline CPU utilization $b^c$ and baseline memory utilization $b^m$ may be established for new microservices without historical data by computing an average of these values from other tests performed by the tuning module 250. To configure baseline latency $b^l$, the tuning module 250 may send a single request to a model with excess CPU and memory resources to determine the optimal latency and set the baseline latency $b^l$ on this basis.

The tuning module 250 defines 404 a configuration search space representing a range of possible configurations for testing. In an example embodiment, a two-dimensional search space may include a set of configurable variables and a range of possible values for each configurable variable. An example search space is defined in Table 1 below. In this embodiment, the search space includes as configurable variables, a number of processes, a number of threads, a number of containers, a number of CPU cores, memory utilization (in Gigabytes), and a model type. The model type may have values defining different types of neural networks (e.g., full network, pruned network, quantized network, etc.) and the remaining variables may take on integer values. Here, the model type may represent different compression techniques associated with the model graph. For example, the search space may include different quantization strengths associated with model compression that affects performance values. In an alternative embodiment, the model type may be constant and the tuning module 250 may perform testing without the model type variable in the search space.

TABLE 1

| Configuration Variable | Value 1 | Value 2 | Value 3 | . . . |
|---|---|---|---|---|
| Number of Processes | 1 | 2 | 3 | . . . |
| Number of Threads | 1 | 2 | 3 | . . . |
| Number of Containers | 1 | 2 | 3 | . . . |
| Number of CPU cores | 1 | 2 | 3 | . . . |
| Memory (GB) | 1 | 2 | 3 | . . . |
| Model Type (Neural Network) | Full Network | Pruned Network | Quantized Network | . . . |

The tuning module 250 selects 406 a configuration from testing by setting each configurable variable to one of the respective possible values. For example, a testable configuration from the above example search space can be represented as: Number of CPU cores=1, Memory=1 GB, Number of Processes=2, Number of Threads=1, Number of containers=4, Model Type=Full Network.

The tuning module 250 runs 408 a load test using the test configuration i to obtain an objective value $O_i$ associated with the test configuration i. Using the example objective function above, the tuning module 250 obtains values for CPU utilization $$x_i^c,$$

memory utilization $$x_i^m,$$

and latency $$x_i^l$$

associated with the load test and then applies the objective function to determine the objective value Oi. Here, the load test may be executed by running the microservice on data associated with a sample request. The sample request may comprise predefined testing data used only for testing or may comprise real request data received via the online concierge system 140. For example, to tune a machine learning microservice that generates search results tailored to a particular customer based on a search query, the tuning module 250 may measure the performance values for example an example search query from an example customer. In one or more embodiments, the load test may generate average performance values derived from processing multiple such requests and/or average the objective values obtained from multiple test runs.

Using the example objective function above, an example load test result from a sample request might include the following measured performance data:

$$x^c=50\%, x^m=30\%, x^l=50 \text{ ms}$$

Using the example weights $w_1=w_2=w_3=1$ and baseline values $b_c=60\%$, $b_m=70\%$, $b_l=20$ ms, the objective function may be computed using the above-measured performance parameters as:

$$O_i=\sqrt{(50-60)^2+(30-70)^2+w_3(50-20)^2}=50.99$$

The tuning module 250 determines 410 whether to run tests on additional configurations. In one embodiment, the tuning module 250 may run tests for the entire search space (all possible configurations) and determine not to run additional tests only when the search space is exhausted. In another embodiment, the tuning module 250 may select only a subset of configurations for testing without necessarily running tests on the entire search space. If the tuning module 250 determines 410 to run an additional test, the tuning module 250 selects 406 the next configuration for testing and repeats the above-described testing process.

When the tuning module 250 determines 410 not to run additional tests, the set of objective values $O_i$ are evaluated 412 to determine the configuration i that results in the optimal objective value $O_i$ (e.g., a minimum objective value). The tuning module 250 may then configure 414 the microservice infrastructure based on the selected configuration yielding the optimal objective value $O_i$.

In some instances, configuring the microservice in accordance with the desired configuration, may include generating and storing one or more parameter values based on the desired configuration selected from the set of test configurations. Additionally or alternatively, one or more commands may be generated and sent to one or more additional systems associated with the microservice based on the one or more parameter values.

In one or more embodiments, the search space may be redefined for testing different microservices. The search space may be defined, in part, based on results of prior tests. Reducing the search space based on prior tests may enable the tuning module 250 to converge more quickly on optimal solutions while reducing resources (and cost) utilized for the testing process. The search state can often be optimized when microservices employ machine learning models having similar characteristics. For example, two Tensorflow model deployments will tend to have similar relationships between CPU utilization and latency. Similarly, updated models that are drop-in replacements of older models (after, for example, training with new data or a new framework) are expected to have similar optimal configurations. In an example embodiment, a Bayesian algorithm may be employed to reduce the search space over time as more tests are conducted.

In one or more embodiments, tuning results may be utilized to predict the latency impact of new microservices that may be launched in the online concierge system 140. The predictions may be used to inform decisions regarding release of new features. In one or more embodiments, a microservice graph may be created to determine dependent services. Leveraging this graph, the impact on the performance can be predicted based on the change in latency. Such predictions may facilitate deployment of guardrails that may prevent launches of certain new features downstream. For example, to avoid aggregate latencies of dependent services from exceeding a threshold, guardrails may be set that limit the allowed ranges of latencies for certain dependent microservices, and the tuning module 250 may then operate to tune the microservices within that constraint.

While the above-described techniques are generally described in the context of a single host deployment architecture (in which the machine learning model is on a single machine instance), the solution can be extended to sharded model deployment architectures (in which the machine learning model is split and executes on multiple machine instances). In this embodiment, the tuning module 250 may tune additional hyperparameters relating to the sharding.

The techniques described herein can be used to optimize selection of hardware on various cloud platforms (including on-premises and/or off-premise cloud platforms) and for performing cloud cost optimization, spot instance selections, and various applications frameworks such as web servers.

The techniques described herein can also be used for running experiments, such as A/B tests. In particular, based on priors learned from historical experiments and latency results from microservice tuning, the impact of a feature launch on experiment metrics can be predicted. This may allow product engineers to make informed decisions and prioritize experiments to achieve positive gains, since latency can be a critical problem for launching new features, and product teams can generally launch a limited number of experiments for a given time period.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

accessing an objective function associated with tuning a configuration of a microservice that performs machine learning inference or training functionality to an online system by executing one or more trained machine learning models, including associated pre-processing or post-processing;

accessing a configuration search space that defines a range of possible configurations of the microservice, wherein the configuration search space includes at least one variable for configuring the one or more trained machine learning models;

for each of a set of test configurations in the configuration search space, configuring respective allocations of resources associated with executing the microservice;

executing the microservice on respective sample requests under the respective allocation of resources for each respective sample request, wherein executing the microservice is performed while measuring respective operating parameters associated with the objective function;

evaluating the objective function using the respective operating parameters to generate respective objective values for each of the set of test configurations;

selecting a desired configuration from the set of test configurations based on the respective objective values; and configuring the microservice in accordance with the desired configuration.

2. The method of claim 1, wherein the objective function seeks to minimize a combination of latency and cost associated with resource utilization.

3. The method of claim 2, wherein the resource utilization includes at least processor utilization and memory utilization.

4. The method of claim 1, wherein the microservice is deployed in a containerized computing environment in which a set of single-threaded or multi-threaded processes execute in containers utilizing dynamically allocated processing and memory resources.

5. The method of claim 1, wherein the configuration search space includes a two-dimensional array of variables and values for the variables, wherein the variables include one or more of: allocated processors, allocated memory, number of containers, number of processes, number of threads, and machine learning model compression.

6. The method of claim 1, wherein the objective function comprises respective baseline values and respective weights associated with each of the operating parameters, and wherein evaluating the objective function is based on the respective operating parameters, the respective baseline values, and the respective weights.

7. The method of claim 6, wherein the respective weights and the respective baseline values are obtained from a trained model that optimizes the respective weights and the respective baseline values based on historical data.

8. The method of claim 1, wherein selecting the desired configuration from the set of test configurations further comprises:

obtaining guardrail constraints associated with one or more of the operating parameters, the guardrail constraints derived from a graph of dependent microservices, wherein the graph of dependent microservices represents user-request paths through machine learning microservices, and the guardrail constraints limit aggregate latencies along the user-request paths; and selecting the desired configuration in which the one or more operating parameters are within the guardrail constraints.

9. A non-transitory computer-readable medium storing instructions that, when executed by one or more processors, cause the one or more processors to perform steps including:

accessing an objective function associated with tuning a configuration of a microservice that performs machine learning inference or training functionality to an online system by executing one or more trained machine learning models, including associated pre-processing or post-processing;

accessing a configuration search space that defines a range of possible configurations of the microservice, wherein the configuration search space includes at least one variable for configuring the one or more trained machine learning models;

for each of a set of test configurations in the configuration search space, configuring respective allocations of resources associated with executing the microservice;

executing the microservice on respective sample requests under the respective allocation of resources for each respective sample request, wherein executing the microservice is performed while measuring respective operating parameters associated with the objective function;

evaluating the objective function using the respective operating parameters to generate respective objective values for each of the set of test configurations;

selecting a desired configuration from the set of test configurations based on the respective objective values; and configuring the microservice in accordance with the desired configuration.

10. The non-transitory computer-readable medium of claim 9, wherein the objective function seeks to minimize a combination of latency and cost associated with resource utilization.

11. The non-transitory computer-readable medium of claim 10, wherein the resource utilization includes at least processor utilization and memory utilization.

12. The non-transitory computer-readable medium of claim 9, wherein the microservice is deployed in a containerized computing environment in which a set of single-threaded or multi-threaded processes execute in containers utilizing dynamically allocated processing and memory resources.

13. The non-transitory computer-readable medium of claim 9, wherein the configuration search space includes a two-dimensional array of variables and values for the variables, wherein the variables include one or more of: allocated processors, allocated memory, number of containers, number of processes, number of threads, and machine learning model compression.

14. The non-transitory computer-readable medium of claim 9, wherein the objective function comprises respective baseline values and respective weights associated with each of the operating parameters, and wherein evaluating the objective function is based on the respective operating parameters, the respective baseline values, and the respective weights.

15. The non-transitory computer-readable medium of claim 14, wherein the respective weights and the respective baseline values are obtained from a trained model that optimizes the respective weights and the respective baseline values based on historical data.

16. The non-transitory computer-readable medium of claim 9, wherein selecting the desired configuration from the set of test configurations further comprises:

obtaining guardrail constraints associated with one or more of the operating parameters, the guardrail constraints derived from a graph of dependent microservices, wherein the graph of dependent microservices represents user-request paths through machine learning microservices, and the guardrail constraints limit aggregate latencies along the user-request paths; and selecting the desired configuration in which the one or more operating parameters are within the guardrail constraints.

17. A computer system comprising:

one or more processors; and a non-transitory computer-readable medium storing instructions that, when executed by the one or more processors, cause the computer system to perform steps including:

accessing an objective function associated with tuning a configuration of a microservice that performs machine learning inference or training functionality to an online system by executing one or more trained machine learning models, including associated pre-processing or post-processing;

accessing a configuration search space that defines a range of possible configurations of the microservice, wherein the configuration search space includes at least one variable for configuring the one or more trained machine learning models;

for each of a set of test configurations in the configuration search space, configuring respective allocations of resources associated with executing the microservice;

executing the microservice on respective sample requests under the respective allocation of resources for each respective sample request, wherein executing the microservice is performed while measuring respective operating parameters associated with the objective function;

evaluating the objective function using the respective operating parameters to generate respective objective values for each of the set of test configurations;

selecting a desired configuration from the set of test configurations based on the respective objective values; and configuring the microservice in accordance with the desired configuration.

18. The computer system of claim 17, wherein the objective function seeks to minimize a combination of latency and cost associated with resource utilization.

19. The computer system of claim 18, wherein the resource utilization includes at least processor utilization and memory utilization.

20. The computer system of claim 17, wherein the microservice is deployed in a containerized computing environment in which a set of single-threaded or multi-threaded processes execute in containers utilizing dynamically allocated processing and memory resources.

\* \* \* \* \*